United States Patent [19]
Isohata et al.

[11] 3,951,673
[45] Apr. 20, 1976

[54] INORGANIC HARDENING COMPOSITION

[75] Inventors: Susumu Isohata; Kyoichi Sasaki, both of Tokyo; Yoshihiro Minamitani, Saitama, all of Japan

[73] Assignee: Asahi Kasei Kogyo Kabushiki Kaisha, Osaka, Japan

[22] Filed: Nov. 12, 1974

[21] Appl. No.: 523,134

Related U.S. Application Data

[63] Continuation-in-part of Ser. No. 365,498, May 31, 1973, abandoned.

[30] Foreign Application Priority Data
July 24, 1972  Japan.................................. 47-73358

[52] U.S. Cl. ................................................. 106/84
[51] Int. Cl.² ...................... C04B 19/04; C09D 1/02

[58] Field of Search............................. 106/84, 38.3

[56] References Cited
UNITED STATES PATENTS

| | | | |
|---|---|---|---|
| 3,222,197 | 12/1965 | Sibert et al. .......................... | 106/84 |
| 3,832,195 | 8/1974 | Butler et al. .......................... | 106/84 |

*Primary Examiner*—J. Poer
*Attorney, Agent, or Firm*—Armstrong, Nikaido & Wegner

[57] ABSTRACT

An inorganic hardening composition containing water glass and at least one of petalite and spodumene fired at a temperature of at least 1,000°C has a high hardness, water resistance, incombustibility and fire resistance.

6 Claims, No Drawings

INORGANIC HARDENING COMPOSITION

This is a Continuation-In-Part application of U.S. Ser. No. 365,498 filed on May 31, 1973, now abandoned.

The present invention relates to an inorganic hardening composition useful as a coating material and a bonding agent.

In general, water glass (e.g. sodium silicate) is known as an excellent inorganic bonding agent, but it has a defect of lacking resistance against moisture. Therefore, various researches have been made in an attempt to impart water resistance to the bonding agent.

Sibert et al patent (U.S. Pat. No. 3,222,197) discloses an inorganic coating comprising water glass and lithium silicate, but it is considered that such inorganic coatings are not sufficient in durability under severe conditions.

The inventors have found that a composition comprising an aqueous solution of water glass and natural petalite or spodumene fired at 1,000°C or higher a mixture of the two is hardened at a temperature of 100° to 300°C and thus hardened composition has a conspicuously high hardness, water resistance, incombustibility and fire resistance.

The hardening components constituting the hardening composition of the present invention are petalite and/or spodumene which are in general naturally obtained. These compounds may be generally shown as follows:

|  | Content of $Li_2O$ | General formula |
|---|---|---|
| Petalite | 3.5 – 4.5% | $Li_2O \cdot Al_2O_3 \cdot 8SiO_2$ |
| Spodumene | 4.0 – 7.5 | $Li_2O \cdot Al_2O_3 \cdot 4SiO_2$ |

One example of analytical values of chemical compositions of petalite is as follows:

| $LiO_2$ | 4.27% |
|---|---|
| $Al_2O_3$ | 17.24 |
| $SiO_2$ | 76.16 |
| $Fe_2O_3$ | 0.04 |
| $Na_2O$ | 0.53 |
| $K_2O$ | 0.62 |
| $CaO$ | 0.21 |
| $MgO$ | 0.24 |

Spodumene, in general, is naturally produced as $\alpha$-spodumene and is converted into $\beta$-spodumene when fired at a temperature of at least 1000°C. Petalite is converted into a mixture of $\beta$-spodumene and $SiO_2$ when fired at a temperature of at least 1000°C. Compounds obtained by firing these petalite and $\alpha$-spodumene at a temperature at least 1000°C are effective as the hardening components of the present invention.

Water glass used in the present invention need not be limited, but an aqueous solution of an alkali silicate such as sodium silicate, potassium silicate, or lithium silicate wherein molar ratio of $SiO_2$ and alkali metal oxide is: 2 : 1 –4 : 1 is generally preferred. Concentration of said alkali silicate solution used may vary in a wide range because viscosity of the water glass is greatly changed by changing the molar ratio of $SiO_2$ and alkali metal, but preferably said solution contains alkali silicate in an amount of 20 – 50% by weight in solid content from the viewpoint of easy handling.

Regarding the grain size of petalite and spodumene, the finer it is, the more reactive they are, but not more than 100 $\mu$ is preferred because when more than 100 $\mu$, the reactivity is somewhat lowered and the lower limit is about 1 $\mu$.

In the hardening composition of the present invention, the ratio of water glass and petalite and/or spodumene is preferably as follows:

| Water glass (50% aqueous solution) | 100 parts |
|---|---|
| Petalite and/or spodumene | 300 – 10 parts |

Said hardening composition hardens gradually even at a normal temperature, but is preferably heat treated at 100° – 300°C to impart excellent water resistance thereto.

The composition of the present invention may be used as a film forming composition or a matrix material. In case of using the composition of the present invention as a coating material, water is added to the composition to adjust viscosity thereof to an optional value and then it is coated by the methods such as spraying, roller coating, brushing, troweling, etc. In this case, a filler may be added to said hardening composition to improve the properties of the coating film.

The composition of the present invention is extremely excellent in adhesiveness to the article to be coated and a dense and strong film can be obtained. Moreover, the composition of the present invention can be coated on various materials such as aluminum, iron, wooden materials, synthetic resins, ceramics, etc.

Furthermore, the composition of the present invention can be used as a bonding agent for particles of aggregate in production of fire brick and insulating brick. In this case, a suitable amount of said hardening composition is added to the aggregate the grain size of which has been adjusted and the mixture is compression molded and then this is cured with heat at higher than 200°C for more than 30 minutes to obtain a rigid hardened product having water resistance, which can be used directly as unburned brick. Besides, the composition of the present invention can also be used as a bonding agent for pasting asbestos slates, concretes, various stone materials, etc.

The present invention will be illustrated by the following Examples.

EXAMPLE 1

Natural petalite and spodumene fired at 1,000°C for 3 hours were ground to less than 200 meshes and these were blended with water glass in the following proportions to obtain hardening compositions (A) and (B), respectively.

| Hardening composition (A) | |
|---|---|
| $Na_2O \cdot 3SiO_2$ (40% aqueous solution) | 100 parts |
| Petalite | 100 parts |
| Hardening composition (B) | |
| $Na_2O \cdot 3SiO_2$ (40% aqueous solution) | 100 parts |
| Spodumene | 100 parts |

Said hardening compositions were coated on glass plates by an applicator, respectively, dried at 100°C for 60 minutes and thereafter heat treated at 200°C for 30 minutes. Thus obtained coating films were homogeneous films of ceramic and had no blisters and cracks. The coating films were dipped in water at 20°C for 30 days to cause no troubles and to display excellent water resistance.

Said hardening compositions (A) and (B) were respectively coated on fire bricks, maintained in an atmosphere at 900°C for 60 minutes and then withdrawn from the atmosphere. The coating film had no cracks and blisters.

EXAMPLE 2

Natural petalite and spodumene were heat treated at 1100°C for 4 hours and ground to less than 200 meshes. Each of them was blended with water glass in the following proportions to obtain hardening compositions (C) and (D).

| | |
|---|---|
| Hardening composition (C) | |
| $Na_2O \cdot 3SiO_2$ (40% aqueous solution) | 100 parts |
| Petalite fired at 1100°C | 100 parts |
| Hardening composition (D) | |
| $Na_2O \cdot 3SiO_2$ (40% aqueous solution) | 100 parts |
| Spodumene fired at 1100°C | 100 parts |

Said hardening compositions were respectively coated on glass plates by applicator, dried at 100°C for 60 minutes and heat treated at 200°C for 30 minutes. Thus obtained coating films were homogenous films of ceramic and had no blisters and cracks. Thus obtained films were subjected to water resisting test and the results are shown in the following Table 1.

Table 1

| | Dipping conditions | Coating film after dipping | |
|---|---|---|---|
| | | State of the film | Pencil hardness of the film |
| Hardening Composition (C) | In water (20°C) for 30 days | Normal | 9H |
| | In hot water (80°C) for 4 hours | Normal | 9H |
| Hardening Composition (D) | In water (20°C) for 30 days | Normal | 9H |
| | In hot water (80°C) for 4 hours | Normal | 9H |

EXAMPLE 3

110 parts of quartz sand (No. 3) having a grain size of 2.0 – 5.0 mm and 20 parts of hardening composition (C) used in Example 2 were mixed and the mixture was molded to a column of 3 cm in diameter and 3 cm in height. Thus molded product was dried at 100°C for 60 minutes and then heat treated at 200°C for 30 minutes to obtain a hardened product, which was dipped in water at 20°C for 30 days to cause no collapse and show excellent water resistance.

As explained above, according to the present invention, a coating or bonding composition having excellent water resistance and fire resistance is obtained and this can be applied for various uses.

The pencil hardness referred to in the above Examples were measured in accordance with the pencil scratch test method specified in JIS K 5400 using the pencil scratch test machine specified in JIS K 5401.

EXAMPLE 4

Hardening compositions comprising 100 parts of $Na_2O \cdot 3SiO_2$ (solid matter 40%) and hardening agents enumerated in Table 1 in such amounts as shown in Table 1 were respectively coated on a glass plate by an applicator, then dried at 100°C for 60 minutes and thereafter heat-treated at 200°C for 30 minutes. Water resistance of each sample was examined to obtain the results as shown in Table 2.

As is clear from the results, the compositions of the present invention were superior in water resistance to other known compositions and it is clear that such unexpected superior effect of the present compositions is caused by firing of the petalite or spodumene at 1000°C or higher.

TABLE 2

| | Hardening compositions | | | | Water resistance | |
|---|---|---|---|---|---|---|
| | Water glass | | Hardening agent | | Dipped in water at 20°C for 30 days | Dipped in water at 80°C for 4 hours |
| Present invention | $Na_2O \cdot 3SiO_2$ (solid matter 40%) | 100 parts | Petalite fired at 1100°C | 100 parts | Nothing occurred | Nothing occurred |
| ″ | ″ | ″ | Spodumene fired at 1100°C | ″ | ″ | ″ |
| Comparative Sample | ″ | ″ | Unfired petalite | ″ | ″ | Coating was dissolved and peeled off |
| ″ | ″ | ″ | Unfired spodumene | ″ | ″ | ″ |
| ″ | ″ | ″ | $ZrSiO_4$ | ″ | Coating was dissolved and peeled off | ″ |
| ″ | ″ | ″ | ZnO | ″ | Nothing occurred | ″ |
| ″ | ″ | ″ | $ZrO_2$ | ″ | Coating was dissolved and peeled off | ″ |
| ″ | ″ | ″ | $Al_2O_3$ | ″ | ″ | ″ |
| ″ | ″ | ″ | $CaSiO_3$ | ″ | ″ | ″ |
| ″ | ″ | ″ | $TiO_2$ | ″ | ″ | ″ |
| ″ | ″ | ″ | Si | 50 parts | Nothing occurred | ″ |
| ″ | ″ | ″ | $Na_2SiF_6$ | 10 parts | ″ | ″ |
| ″ | ″ | ″ | Petalite fired at 900°C | 100 parts | | |

TABLE 2-continued

| Hardening compositions | | | Water resistance | |
|---|---|---|---|---|
| Water glass | Hardening agent | | Dipped in water at 20°C for 30 days | Dipped in water at 80°C for 4 hours |
| " | " | Spodumene fired at 900°C  100 parts | " | " |

What is claimed is:

1. An inorganic hardening composition comprising water glass and at least one member selected from the group consisting of petalite and spodumene which have been fired at a temperature of at least 1,000°C, wherein the proportion of the water glass to the petalite and/or spodumene is 100 parts: 300 – 10 parts.

2. An inorganic hardening composition according to claim 1, wherein the water glass consists essentially of aqueous solutions of alkali silicates selected from the group consisting of sodium silicate, potassium silicate, and lithium silicate.

3. An inorganic hardening composition according to claim 2, wherein the molar ratio of $SiO_2$ and alkali metal oxide in the water glass is 2 : 1 – : 1.

4. An organic hardening composition according to claim 1, wherein the petalite and spodumene have a grain size of 1 – 100 $\mu$.

5. An inorganic hardening composition according to claim 1, wherein the petalite and/or spodumene used are those which have been heated to a temperature of higher than 1,100°C.

6. An inorganic hardening composition according to claim 2, wherein the solution contains 20 – 50% by weight of alkali silicate in solid content.

* * * * *